C. R. UEBELMESSER.
AUTOMATIC SHUTTER FOR MOVING PICTURE MACHINES.
APPLICATION FILED OCT. 5, 1908.

1,040,468.

Patented Oct. 8, 1912.

2 SHEETS—SHEET 1.

Fig. 1,

WITNESSES:

INVENTOR
Charles R. Uebelmesser
BY
E. W. Marshall
ATTORNEY.

C. R. UEBELMESSER.
AUTOMATIC SHUTTER FOR MOVING PICTURE MACHINES.
APPLICATION FILED OCT. 5, 1908.

1,040,468.

Patented Oct. 8, 1912.

2 SHEETS—SHEET 2.

WITNESSES:

INVENTOR
Charles R. Uebelmesser
BY
E. W. Marshall
ATTORNEY

UNITED STATES PATENT OFFICE.

CHARLES R. UEBELMESSER, OF NEW YORK, N. Y., ASSIGNOR TO AMERICAN MOVING PICTURE MACHINE COMPANY, OF NEW YORK, N. Y., A CORPORATION OF NEW YORK.

AUTOMATIC SHUTTER FOR MOVING-PICTURE MACHINES.

1,040,468. Specification of Letters Patent. Patented Oct. 8, 1912.

Application filed October 5, 1908. Serial No. 456,253.

*To all whom it may concern:*

Be it known that I, CHARLES R. UEBELMESSER, a subject of the Emperor of Germany, and a resident of the city of New York, in the county of New York and State of New York, United States of America, have invented certain new and useful Improvements in Automatic Shutters for Moving-Picture Machines, of which the following is a specification.

My invention relates to improvements in automatically actuated protecting shutters for moving picture machines, and its object is to improve upon devices of this kind and to provide a simple and efficient protective shutter for the films which has decided advantages over those hitherto known.

In the following specification I will describe the construction and arrangement of a shutter and its actuating mechanism made according to my invention, and point out the novel features thereof in the appended claims.

Figure 1:
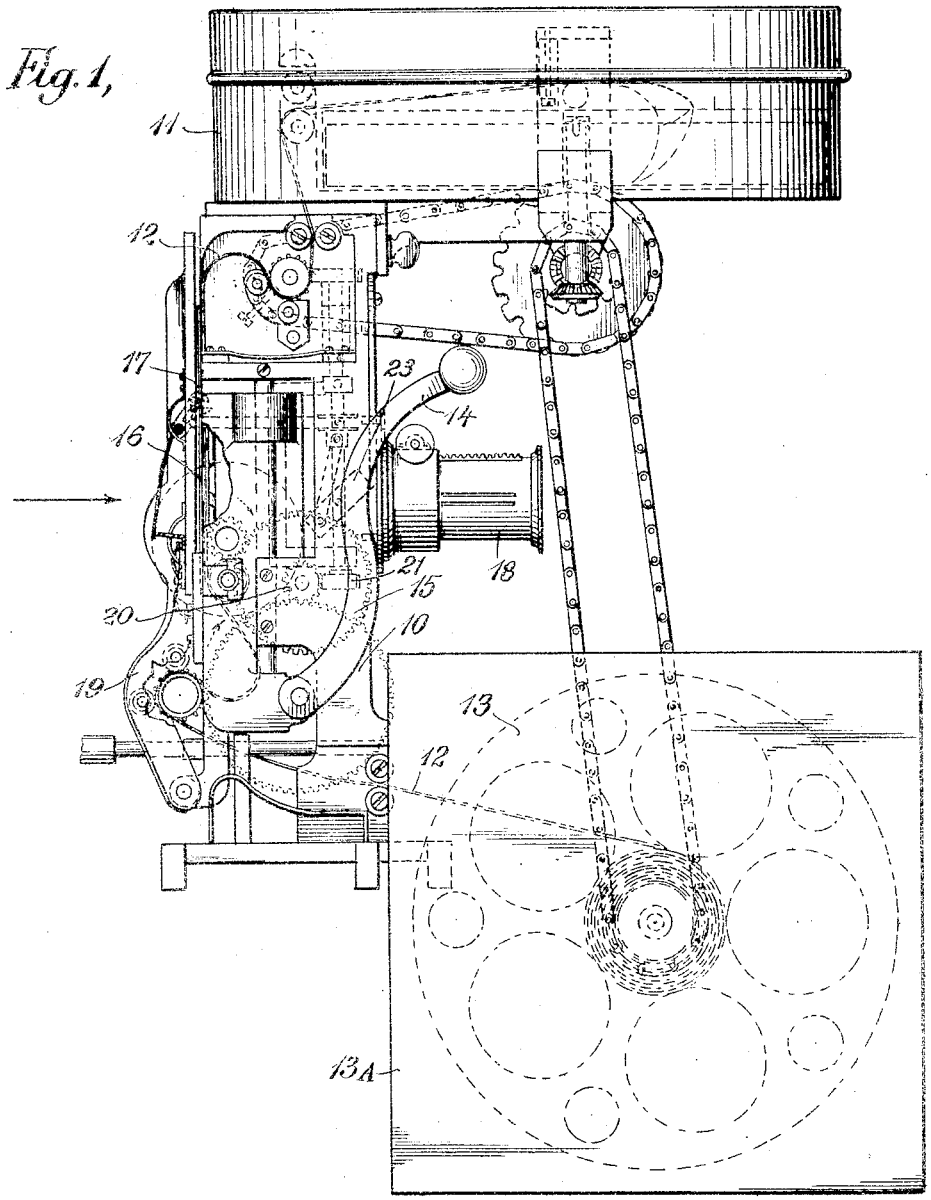
Figure 2:
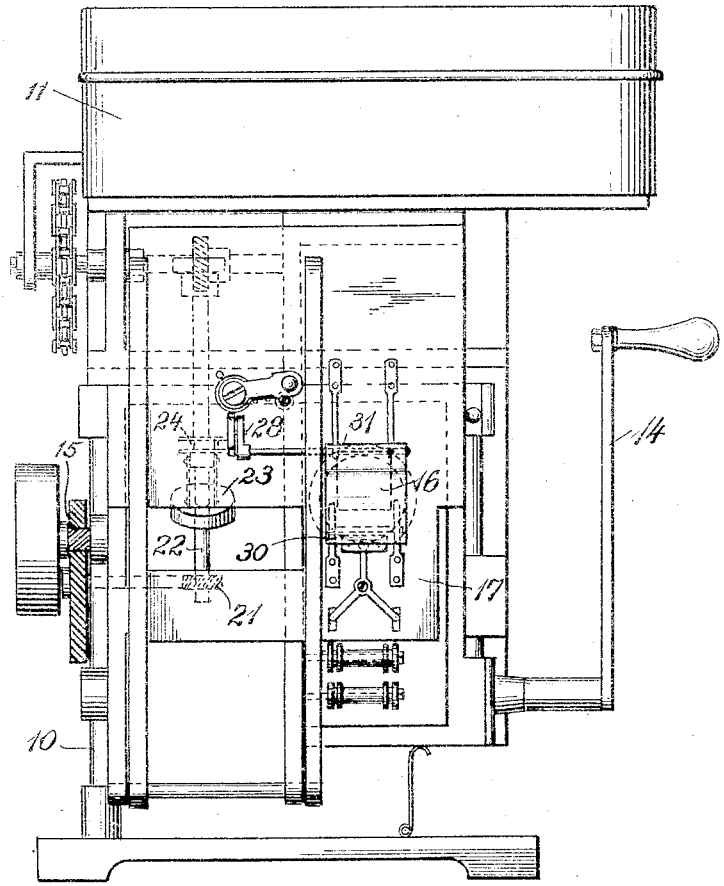
Figure 3:
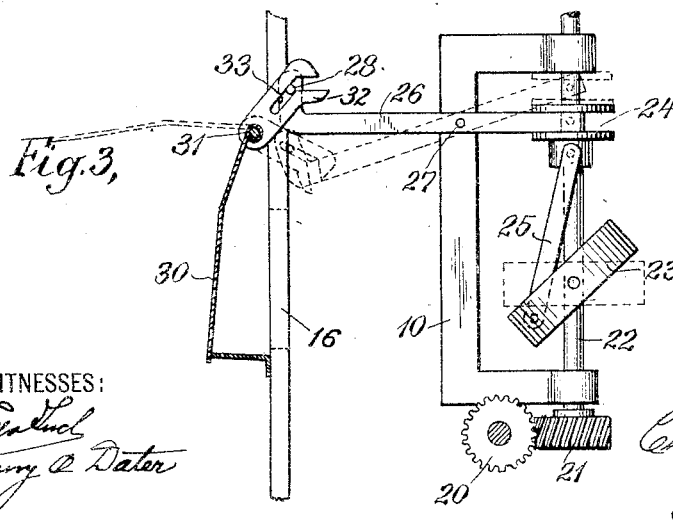

Referring to the drawings, Figure 1 is a side elevation of a moving picture machine with my invention applied thereto. Fig. 2 is a rear elevation of the same apparatus. In Fig. 3 the shutter itself with its connected actuating mechanism is shown in side elevation with the shutter drawn in section, and with the open position of the shutter and some of the other parts indicated by dotted lines.

Like characters of reference designate corresponding parts in all of the figures.

10 designates the frame of a moving picture machine which may be of any preferred form or design. In this case a horizontal receptacle 11 is shown at the top of the machine from which a coiled-up film 12 is to be unwound.

13 is a reel mounted upon a horizontal pivot at the lower part of the machine, upon which reel film 12 is wound during the operation of the machine.

14 designates a crank by means of which movement may be imparted to the various parts of the mechanism through suitable gearing 15. In many machines the mechanism is driven by a motor of some kind, but as this forms no part of the present invention I have shown a simple manually operated device for this purpose.

Only so much of the mechanism as will be necessary to explain the application and operation of this invention will be described, as it is only necessary to point out that by means of it the film, upon which a series of transparent pictures appear in being unwound from the receptacle 11 and wound up upon the reel 13, is carried rapidly past an opening 16 in a plate 17 with an intermittent motion in such a manner that the pictures on the film are brought in front of this opening in rapid succession. A powerful lamp behind the machine is arranged to send its rays, in the direction indicated by the arrow in Fig. 1, through these pictures on the film, and to project them through suitable lenses in an inclosing casing or barrel 18 onto a distant screen. These operations may be accomplished by any of the well-known devices now in common use for this purpose.

In practice, it has been found that the rays of light from the lamp are so hot that they injure the film 12 if they are applied thereto when the latter is at rest. The films are generally of highly inflammable material so that it becomes necessary to protect them and to remove all danger of their becoming ignited. For this purpose the rolls or films in the machine shown are inclosed in airtight receptacles 11 and 13$^A$ and are carried through the machine in inclosing casings such as 19, and covered by the plate 17. But at the opening 16 they are necessarily exposed to the heat from the lamp. When the film is in motion, the time which any portion of it is thus exposed to the heat is insufficient to cause its temperature to be raised to a harmful extent, but when the machine is at rest, as, for example, just before it is started, it should not be exposed to the heat of the powerful light rays used. Also if, during the operation, the film driving mechanism should stop for any reason or from any cause, the film should be immediately protected from such rays. This matter is of importance and one which, if manually controlled, would require skill and great care on the part of the operator. Therefore it should be taken care of by the machine itself, and the object of this invention is to provide a cover or shutter over the opening 16 for protecting the film, and means for automatically opening and closing this shutter.

20 designates a pinion which forms a portion of the gearings 15, and which is in mesh with a gear 21 on the lower end of a vertical spindle 22. A balance-wheel 23 is pivotally supported on this spindle. A sliding collar 24 is loosely mounted upon the spindle 22 above the balance-wheel and is connected with one side of the latter by a link 25.

26 is a lever pivoted at 27 in a part of the machine frame 10. The inner end of this lever is arranged to engage with the collar 24 and to be moved up or down thereby. A pin 28 projects from the outer end of the lever.

30 designates a shutter preferably constructed of sheet metal and arranged, when closed, to be between the source of light and the film over the orifice 16. The mechanism which I am describing is arranged to move this shutter up out of the way when the machine is in motion. The shutter is pivoted at 31 and has a cam member 32 projecting from one of its sides. 33 is a slot in the cam member into which the pin 28 projects.

The parts above described are so proportioned and arranged that when at rest the weight of the shutter 30 and the collar 24 and other connected parts will tilt the balance-wheel 23 into the position in which it is shown in the drawings. But as soon as the mechanism is operated to drive the film, the spindle 22 will be rotated and the balance-wheel, under the action of centrifugal force, will tend to assume the position in which it is shown by dotted lines in Fig. 3. This, through the connections above described, will raise the shutter so that when the machine attains its speed, the shutter will be wide open. When the machine is slowed down enough to injure the film, the weight of the shutter will overcome the effect of centrifugal force and cause it to again drop down over the opening 16. By this simple means, without the use of springs or complicated mechanisms, the motion of the film driving mechanism will automatically control the shutter which will effectively protect the film from the hot light rays from a lamp when the film is at rest and will allow the full light to pass freely through the film while it is being driven.

What I claim is.—

1. In a moving picture machine, a film driving mechanism, a self-closing protective shutter for the film having a cam member thereon, a tilting balance wheel, and mechanism operatively connecting said balance wheel and cam member arranged to cause the shutter to be automatically opened when the machine is in motion.

2. In a moving picture machine, a film driving mechanism, a tilting balance wheel driven by said film-driving mechanism, a protective shutter for the film having a projection provided with a cam slot, and connections between said cam slot and wheel, whereby the shutter is caused to be automatically opened when the machine is in motion.

3. In a moving picture machine, a film driving mechanism, a tilting balance wheel driven by said film-driving mechanism, a protective shutter for the film having a projection provided with a cam slot, a lever having a pin engaging said cam slot, and connections between said lever and balance wheel, whereby the shutter is caused to open when the machine is in motion.

In testimony whereof I have signed my name to this specification in the presence of two subscribing witnesses.

CHARLES R. UEBELMESSER.

Witnesses:
ELLA TUCH,
ERNEST W. MARSHALL.